(12) United States Patent
Kawabuchi et al.

(10) Patent No.: US 10,643,564 B2
(45) Date of Patent: May 5, 2020

(54) LIQUID CRYSTAL DISPLAY AND METHOD OF DRIVING LIQUID CRYSTAL DISPLAY

(71) Applicant: Mitsubishi Electric Corporation, Tokyo (JP)

(72) Inventors: Shinji Kawabuchi, Tokyo (JP); Manabu Tanahara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/557,767

(22) Filed: Aug. 30, 2019

(65) Prior Publication Data

US 2019/0385559 A1 Dec. 19, 2019

Related U.S. Application Data

(62) Division of application No. 15/829,108, filed on Dec. 1, 2017, now Pat. No. 10,482,837.

(30) Foreign Application Priority Data

Dec. 5, 2016 (JP) .................. 2016-235582

(51) Int. Cl.
  *G09G 3/36* (2006.01)
  *G02F 1/1368* (2006.01)
  *G02F 1/1362* (2006.01)

(52) U.S. Cl.
  CPC ......... *G09G 3/3677* (2013.01); *G02F 1/1368* (2013.01); *G02F 1/136286* (2013.01); *G09G 3/3648* (2013.01); *G02F 2001/136254* (2013.01); *G09G 2300/043* (2013.01); *G09G 2300/0408* (2013.01); *G09G 2310/0245* (2013.01); *G09G 2310/0264* (2013.01); *G09G 2310/0278* (2013.01);
  (Continued)

(58) Field of Classification Search
  None
  See application file for complete search history.

(56) References Cited

U.S. PATENT DOCUMENTS 5,373,377 A 12/1994 Ogawa et al.
5,852,480 A 12/1998 Yajima et al.
(Continued)

FOREIGN PATENT DOCUMENTS

JP  H10-010494 A  1/1998
JP  2001-022326 A  1/2001

*Primary Examiner* — Duane N Taylor, Jr.
(74) *Attorney, Agent, or Firm* — Studebaker & Brackett PC (57) ABSTRACT

A liquid crystal display includes scanning lines and signal lines arranged in a matrix pattern on a TFT substrate, a pixel being formed at a crossing portion of each scanning line and each signal line, and including a TFT that is connected to each scanning line and each signal line, first nonlinear resistance elements formed respectively in the scanning lines, each of which being connected to one scanning line at one end thereof and to a short ring power-supply line for a scanning line at another end thereof, and second nonlinear resistance elements formed respectively in the signal lines, each of which being connected to one signal line at one end thereof and to a short ring power-supply line for a signal line at another end thereof. A voltage is applied to the first and second nonlinear resistance elements independently of each scanning line and each signal line.

8 Claims, 3 Drawing Sheets

(52) U.S. Cl.
CPC ............... *G09G 2320/0257* (2013.01); *G09G 2330/021* (2013.01); *G09G 2330/027* (2013.01)

(56) References Cited

U.S. PATENT DOCUMENTS

| | | | |
|---|---|---|---|
| 9,000,796 B2* | 4/2015 | Shirouzu | G02F 1/136204 324/760.02 |
| 2010/0026619 A1 | 2/2010 | Umezaki | |
| 2014/0091997 A1 | 4/2014 | Han et al. | |

* cited by examiner

F I G. 1

F I G . 2

F I G. 3

LIQUID CRYSTAL DISPLAY AND METHOD OF DRIVING LIQUID CRYSTAL DISPLAY

CROSS-REFERENCE TO RELATED APPLICATIONS

This application is a Divisional of U.S. application Ser. No. 15/829,108 filed on Dec. 1, 2017, which claims benefit of priority to Japanese Patent Application No. 2016-235582 filed on Dec. 5, 2016, the entire content of which is incorporated herein by reference.

BACKGROUND OF THE INVENTION

Field of the Invention

The present invention relates to a liquid crystal display (LCD) of an active matrix type in which thin film transistors (TFTs) are used as switching devices, and to a method of driving the liquid crystal display.

Description of the Background Art

A TFT substrate including TFTs as switching devices is utilized in, for example, an electro-optical device such as a liquid crystal display being a display device that utilizes liquid crystals and a light-emitting display device being a display device that utilizes light emitting diodes (LEDs). A semiconductor device such as a TFT has a feature in low power consumption and its thin profile, and is actively applied to a flat panel display.

In the liquid crystal display, there are a simple matrix LCD and a TFT-LCD that uses TFTs as switching devices. The TFT-LCD is superior to the simple matrix LCD in display quality, and is widely used in display products such as a mobile computer, a notebook computer, and a television.

In general, the TFT-LCD has a structure in which a liquid crystal layer is sandwiched between a TFT substrate including a plurality of TFTs that are arranged in arrays and an opposing substrate including a color filter or the like. A polarizing plate is provided in each of a substrate on a front surface side of the liquid crystal display and a substrate on a back surface side thereof, and a backlight is provided on a further outer side of the back surface side. With such a structure, the TFT-LCD can perform satisfactory color display.

As a driving mode for the liquid crystals in the liquid crystal display, there are a vertical electric-field mode such as a twisted nematic (TN) mode and a vertical alignment (VA) mode, and a horizontal electric-field mode such as an in-plane switching mode and a fringe field switching (FFS) mode. In general, the liquid crystal display of a horizontal electric-field mode is more advantageous than the liquid crystal display of a vertical electric-field mode in realizing a wide viewing angle, and is becoming the mainstream in display products such as a personal computer and an on-vehicle display device.

In the liquid crystal display of a vertical electric-field mode as typified by the TN mode, a pixel electrode to be applied with a voltage in accordance with an image signal is arranged in the TFT substrate, and a common electrode to be applied with a common voltage being a fixed voltage is arranged in the opposing substrate. The liquid crystals of the liquid crystal layer are driven by an electric field in a substantially vertical direction with respect to a display surface of the liquid crystal display.

On the other hand, in the liquid crystal display of a horizontal electric-field mode, both of the pixel electrode and the common electrode are arranged in the TFT substrate. The liquid crystals of the liquid crystal layer are driven by an electric field in a substantially horizontal direction with respect to the display surface of the liquid crystal display. Particularly, in the TFT substrate of the liquid crystal display adopting the FFS mode, the pixel electrode and the common electrode are arranged to be opposed vertically through intermediation of an insulating film. In this case, any one of the pixel electrode and the common electrode may be arranged on the back surface side. The electrode arranged on the back surface side is formed into a flat-plate-like shape, and the electrode arranged on the front surface side, that is, on a side close to the liquid crystal layer, is formed into a lattice shape or a comb-tooth-like shape having slits.

On the TFT substrate, scanning lines and signal lines are arranged in a matrix pattern, and a pixel is formed at a crossing portion of the scanning line and the signal line in a display region. The pixel is formed of the TFT, a storage capacitor, the pixel electrode, and the common electrode. In a frame region outside the display region, a scanning-line driving circuit for driving the scanning lines and a signal-line driving circuit for driving the signal lines are arranged. A signal processing circuit is arranged outside the TFT substrate through intermediation of flexible printed circuits (FPCs) or the like. The scanning-line driving circuit and the signal-line driving circuit may be formed as a separate integrated circuit (IC) from the TFT substrate, and may be formed in the TFT substrate in the same manufacturing process as a manufacturing process for forming the TFTs.

When display is performed in the TFT-LCD, the scanning-line driving circuit and the signal-line driving circuit apply a voltage to each scanning line and each signal line in accordance with a signal input from the signal processing circuit. Then, the TFT that forms the pixel is driven and an electric charge is injected into the pixel electrode to thereby apply a voltage to the liquid crystals, and thus predetermined display is performed. At this time, the scanning-line driving circuit turns the scanning lines into an on state by applying a voltage sequentially from one scanning line to another only during a predetermined time period, that is, turns the TFTs into an on state, and during a time period other than the above turns the scanning lines into an off state in which a voltage is not applied, that is, turns the TFTs into an off state. The signal-line driving circuit applies a voltage to the signal lines that cross with the scanning lines in accordance with a display gradation.

When the scanning-line driving circuit and the signal-line driving circuit abruptly suspend the application of the voltage to the scanning lines and the signal lines at the time of suspending the display of the TFT-LCD, the electric charge injected into the pixel electrode may remain to be retained therein, which may generate a phenomenon called "image retention" in which a particular display continues to remain. The image retention is an unpreferable state for the display of the TFT-LCD.

As a countermeasure for the above, hitherto, there is disclosed a technology in which a GND voltage, that is, a voltage of 0 V, is applied to the signal lines and the common electrode after all of the scanning lines are turned into an on state, and then all the electrical power supplied to the TFT-LCD is turned off so that the electric charge does not remain in the pixel electrode at the time of suspending the display (refer to Japanese Patent Application Laid-Open No. 2001-22326, for example). Note that, a GND voltage is hereinafter also referred to as a ground voltage.

Further, there is disclosed a technology in which a nonlinear resistance element is connected to each of the scanning lines and the signal lines, to thereby discharge the electric charge retained in the scanning lines and the signal lines through the nonlinear resistance element (refer to Japanese Patent Application Laid-Open No. 10-10494, for example).

In Japanese Patent Application Laid-Open No. 2001-22326, the IC for driving the scanning lines needs to have a function of turning all of the scanning lines into an on state, and hence there is a problem in requiring a cost. Further, in a case where the circuit for driving the scanning lines is formed in the TFT substrate in the same manufacturing process as the manufacturing process for forming the TFTs, there is a problem in difficulty of assigning the function of turning all of the scanning lines into an on state to the circuit.

In Japanese Patent Application Laid-Open No. 10-10494, an electric charge cannot be prevented from remaining in the pixel electrode at the time of suspending the display, and hence there is a problem in generating image retention.

SUMMARY

The present invention has an object to provide a liquid crystal display capable of preventing image retention from being generated with simple configuration at the time of suspending display, and a method of driving a liquid crystal display.

In order to solve the above-mentioned problems, a liquid crystal display according to the present invention includes a plurality of scanning lines and a plurality of signal lines, a pixel, a plurality of first nonlinear resistance elements, and a plurality of second nonlinear resistance elements. The plurality of scanning lines and the plurality of signal lines are arranged in a matrix pattern on a substrate. The pixel is formed at a crossing portion of each of the plurality of scanning lines and each of the plurality of signal lines, and includes a thin film transistor that is connected to each of the plurality of scanning lines and each of the plurality of signal lines. The plurality of first nonlinear resistance elements are formed respectively in the plurality of scanning lines. Each of the plurality of first nonlinear resistance elements is connected to one of the plurality of scanning lines at one end thereof and is connected to a first short ring line at another end thereof. The plurality of second nonlinear resistance elements are formed respectively in the plurality of signal lines. Each of the plurality of second nonlinear resistance elements is connected to one of the plurality of signal lines at one end thereof and is connected to a second short ring line at another end thereof. A voltage is applied to the plurality of first nonlinear resistance elements and the plurality of second nonlinear resistance elements independently of each of the plurality of scanning lines and each of the plurality of signal lines.

According to the present invention, the liquid crystal display includes the plurality of scanning lines and the plurality of signal lines, the pixel, the plurality of first nonlinear resistance elements, and the plurality of second nonlinear resistance elements. The plurality of scanning lines and the plurality of signal lines are arranged in a matrix pattern on the substrate. The pixel is formed at the crossing portion of each of the plurality of scanning lines and each of the plurality of signal lines, and includes the thin film transistor that is connected to each of the plurality of scanning lines and each of the plurality of signal lines. The plurality of first nonlinear resistance elements are formed respectively in the plurality of scanning lines. Each of the plurality of first nonlinear resistance elements is connected to one of the plurality of scanning lines at one end thereof and is connected to the first short ring line at another end thereof. The plurality of second nonlinear resistance elements are formed respectively in the plurality of signal lines. Each of the plurality of second nonlinear resistance elements is connected to one of the plurality of signal lines at one end thereof and is connected to the second short ring line at another end thereof. A voltage is applied to the plurality of first nonlinear resistance elements and the plurality of second nonlinear resistance elements independently of each of the plurality of scanning lines and each of the plurality of signal lines. Hence, it is possible to prevent image retention from being generated with simple configuration at the time of suspending display.

Further, a liquid crystal display according to the present invention includes a plurality of scanning lines and a plurality of signal lines, a pixel, a short ring line, inspection thin film transistors on a scanning line side, an inspection scanning line, inspection thin film transistors on a signal line side, and an inspection signal line. The plurality of scanning lines and the plurality of signal lines are arranged in a matrix pattern on a substrate. The pixel is formed at a crossing portion of each of the plurality of scanning lines and each of the plurality of signal lines, and includes a thin film transistor that is connected to each of the plurality of scanning lines and each of the plurality of signal lines. The short ring line is connected to each of the plurality of scanning lines and each of the plurality of signal lines. The inspection thin film transistors on a scanning line side are formed respectively in the plurality of scanning lines. The inspection scanning line is arranged so as to be connected to each of the plurality of scanning lines through intermediation of each of the inspection thin film transistors on a scanning line side. The inspection thin film transistors on a signal line side are formed respectively in the plurality of signal lines. The inspection signal line is arranged so as to be connected to each of the plurality of signal lines through intermediation of each of the inspection thin film transistors on a signal line side.

Further, the liquid crystal display includes the plurality of scanning lines and the plurality of signal lines, the pixel, the short ring line, the inspection thin film transistors on a scanning line side, the inspection scanning line, the inspection thin film transistors on a signal line side, and the inspection signal line. The plurality of scanning lines and the plurality of signal lines are arranged in a matrix pattern on the substrate. The pixel is formed at the crossing portion of each of the plurality of scanning lines and each of the plurality of signal lines, and includes the thin film transistor that is connected to each of the plurality of scanning lines and each of the plurality of signal lines. The short ring line is connected to each of the plurality of scanning lines and each of the plurality of signal lines. The inspection thin film transistors on a scanning line side are formed respectively in the plurality of scanning lines. The inspection scanning line is arranged so as to be connected to each of the plurality of scanning lines through intermediation of each of the inspection thin film transistors on a scanning line side. The inspection thin film transistors on a signal line side are formed respectively in the plurality of signal lines. The inspection signal line is arranged so as to be connected to each of the plurality of signal lines through intermediation of each of the inspection thin film transistors on a signal line side. Hence, it is possible to prevent image retention from being generated with simple configuration at the time of suspending display.

Further, the present invention is intended for a method of driving a liquid crystal display, which is a method of driving a liquid crystal display at the time of suspending display. The method of driving a liquid crystal display according to the present invention includes the following steps (a) to (e). The step (a) is to suspend application of a voltage to each of the plurality of scanning lines. The step (b) is to apply, after the step (a), a predetermined voltage to each of the plurality of scanning lines via the first short ring line and each of the plurality of first nonlinear resistance elements. The step (c) is to apply, after the step (a), a ground voltage to each of the plurality of signal lines via the second short ring line and each of the plurality of second nonlinear resistance elements. The step (d) is to apply, after the step (a), a ground voltage to a common electrode that forms the pixel. The step (e) is to suspend, after the step (b), the step (c), and the step (d), the application of the voltage to each of the plurality of scanning lines, each of the plurality of signal lines, and the common electrode in the step (b), the step (c), and the step (d).

Further, the method of driving a liquid crystal display is a method of driving a liquid crystal display at the time of suspending display. The method of driving a liquid crystal display includes the following steps (a) to (e). The step (a) is to suspend the application of the voltage to each of the plurality of scanning lines. The step (b) is to apply, after the step (a), the predetermined voltage to each of the plurality of scanning lines via the first short ring line and each of the plurality of first nonlinear resistance elements. The step (c) is to apply, after the step (a), the ground voltage to each of the plurality of signal lines via the second short ring line and each of the plurality of second nonlinear resistance elements. The step (d) is to apply, after the step (a), the ground voltage to the common electrode that forms the pixel. The step (e) is to suspend, after the step (b), the step (c), and the step (d), the application of the voltage to each of the plurality of scanning lines, each of the plurality of signal lines, and the common electrode in the step (b), the step (c), and the step (d). Hence, it is possible to prevent image retention from being generated with simple configuration at the time of suspending display.

Further, the present invention is intended for a method of driving a liquid crystal display, which is a method of driving a liquid crystal display at the time of suspending display. The method of driving a liquid crystal display according to the present invention includes the following steps (a) to (e). The step (a) is to suspend application of a voltage to each of the plurality of scanning lines and each of the plurality of signal lines. The step (b) is to apply, after the step (a), a predetermined voltage to each of the plurality of scanning lines via the inspection scanning line and the inspection thin film transistors on a scanning line side. The step (c) is to apply, after the step (a), a ground voltage to each of the plurality of signal lines via the inspection signal line and the inspection thin film transistors on a signal line side. The step (d) is to apply, after the step (a), a ground voltage to a common electrode that forms the pixel. The step (e) is to suspend, after the step (b), the step (c), and the step (d), the application of the voltage to each of the plurality of scanning lines, each of the plurality of signal lines, and the common electrode in the step (b), the step (c), and the step (d).

Further, the method of driving a liquid crystal display is a method of driving a liquid crystal display at the time of suspending display. The method of driving a liquid crystal display includes the following steps (a) to (e). The step (a) is to suspend the application of the voltage to each of the plurality of scanning lines and each of the plurality of signal lines. The step (b) is to apply, after the step (a), the predetermined voltage to each of the plurality of scanning lines via the inspection scanning line and the inspection thin film transistors on a scanning line side. The step (c) is to apply, after the step (a), the ground voltage to each of the plurality of signal lines via the inspection signal line and the inspection thin film transistors on a signal line side. The step (d) is to apply, after the step (a), the ground voltage to the common electrode that forms the pixel. The step (e) is to suspend, after the step (b), the step (c), and the step (d), the application of the voltage to each of the plurality of scanning lines, each of the plurality of signal lines, and the common electrode in the step (b), the step (c), and the step (d). Hence, it is possible to prevent image retention from being generated with simple configuration at the time of suspending display.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention are described below in accordance with the drawings.

First Preferred Embodiment

<Configuration>

Figure 1:
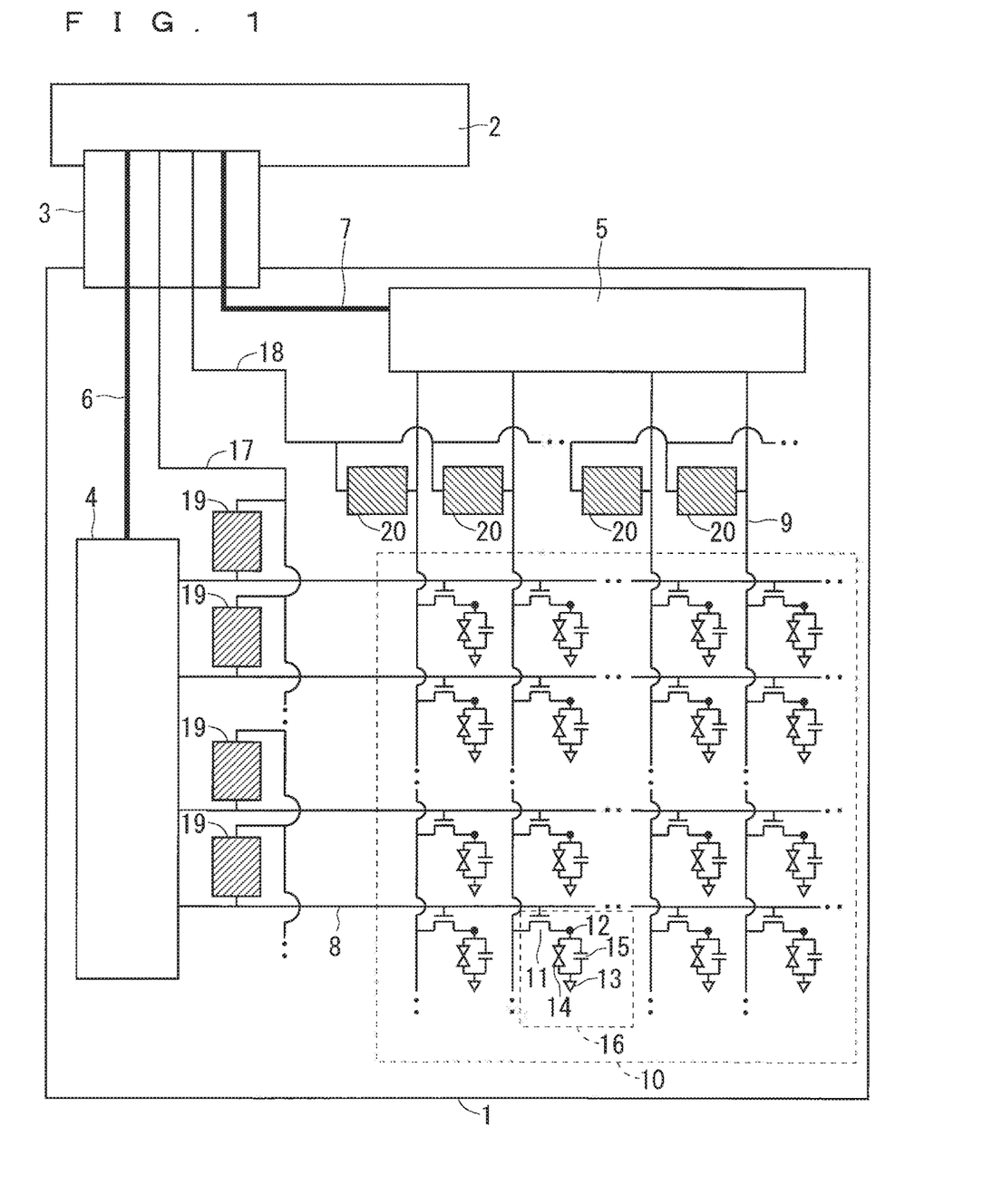
FIG. 1 is a view for illustrating an example of a configuration of a liquid crystal display according to a first preferred embodiment of the present invention.

FIG. 1 is a view for illustrating an example of a configuration of a liquid crystal display according to a first preferred embodiment of the present invention, which illustrates a circuit configuration for activating liquid crystals 14. Note that, a color filter substrate and a polarizing plate that form the liquid crystal display are unrelated to the circuit for activating the liquid crystals, and hence illustration thereof is omitted in FIG. 1. Further, a backlight is operated independently from a TFT substrate 1, and hence illustration thereof is omitted.

The liquid crystal display includes the TFT substrate 1 and a control circuit board 2, and the TFT substrate 1 is connected to the control circuit board 2 through intermediation of FPCs 3. In the TFT substrate 1, a scanning-line driving circuit 4 and a signal-line driving circuit 5 are provided. The scanning-line driving circuit 4 is connected to the control circuit board 2 through intermediation of an image power-supply line 6 for a scanning line and the FPCs 3. The signal-line driving circuit 5 is connected to the control circuit board 2 through intermediation of an image power-supply line 7 for a signal line and the FPCs 3. An image signal, electrical power, and the like are supplied to the control circuit board 2 from the outside. Note that, each of the image power-supply line 6 for a scanning line and the image power-supply line 7 for a signal line is formed of a plurality of lines, but is collectively illustrated as one line in the example of FIG. 1.

A plurality of scanning lines 8 and a plurality of signal lines 9 are arranged in a matrix pattern on the TFT substrate 1, and a pixel 16 is formed at a crossing portion of the scanning line 8 and the signal line 9 in a display region 10. The pixel 16 is formed of a TFT 11 connected to the scanning line 8 and the signal line 9, a pixel electrode 12, a common electrode 13, the liquid crystals 14, and a storage capacitor 15.

A nonlinear resistance element 19 being a first nonlinear resistance element is formed in each of the scanning lines 8. The nonlinear resistance element 19 is connected to the scanning line 8 at one end thereof, and is connected to a short ring power-supply line 17 for a scanning line being a first short ring line at another end thereof. The short ring power-supply line 17 for a scanning line is connected to the control circuit board 2 through intermediation of the FPCs 3. A nonlinear resistance element 20 being a second nonlinear resistance element is formed in each of the signal lines 9. The nonlinear resistance element 20 is connected to the signal line 9 at one end thereof, and is connected to a short ring power-supply line 18 for a signal line being a second short ring line at another end thereof. The short ring power-supply line 18 for a signal line is connected to the control circuit board 2 through intermediation of the FPCs 3. A voltage is applied to the nonlinear resistance elements 19 and 20 from the control circuit board 2. That is, a voltage is applied to the nonlinear resistance elements 19 and 20 independently of the scanning lines 8 and the signal lines 9.

<Operation>

First, description is given to a case where arbitrary display is performed on the liquid crystal display.

The display is realized by applying a voltage to the liquid crystals 14 of the pixel 16 formed in a matrix pattern in the display region 10. Specifically, the control circuit board 2 supplies an image signal and a power-supply voltage to each of the scanning-line driving circuit 4 and the signal-line driving circuit 5 via the image power-supply line 6 for a scanning line and the image power-supply line 7 for a signal line. Further, the control circuit board 2 applies a common voltage being a fixed voltage to the short ring power-supply line 17 for a scanning line and the short ring power-supply line 18 for a signal line.

The scanning-line driving circuit 4 applies a voltage to turn the scanning lines 8 into an on state sequentially from one line to another. Further, the signal-line driving circuit 5 applies a voltage to the signal lines 9 so that an arbitrary pixel 16 performs predetermined display in accordance with the application of the voltage from the scanning-line driving circuit 4 to the scanning lines 8. That is, when an electric charge is injected into the pixel electrode 12 from the signal lines 9 at the time of an on state of the TFT 11 of each pixel 16, transmittance of the liquid crystals 14 changes in accordance with a voltage generated between the pixel electrode 12 and the common electrode 13. At this time, a light from a backlight is transmitted to the liquid crystals 14, and thus a desired image is displayed. Note that, for example, a voltage of 24 V is applied to the scanning lines 8 to turn the scanning lines 8 into an on state, and a voltage of –6 V is applied to the scanning lines 8 to turn the scanning lines 8 into an off state. Further, a voltage of from 11 V to 0 V is applied to the signal lines 9 and the pixel electrode 12, and a voltage of 5 V is applied to the common electrode 13.

Next, description is given to a case where the display in the liquid crystal display is turned off, that is, the display is suspended.

Suspension of the display is realized by suspending the supply of the image signal and the power-supply voltage from the control circuit board 2 to each of the scanning-line driving circuit 4 and the signal-line driving circuit 5. At this time, in a case where resistance of the TFT 11, the liquid crystals 14, and the storage capacitor 15 in the pixel 16 is high, there is a problem in that the liquid crystals 14 remain to be applied with a voltage due to a long period of maintenance of the electric charge retained in the pixel electrode 12 and the display state is maintained due to the transmittance of the liquid crystals 14, resulting in an appearance of image retention. In order to solve such a problem, the control circuit board 2 suspends the operation of the scanning-line driving circuit 4 to suspend the application of the voltage from the scanning-line driving circuit 4 to the scanning lines 8 at the time of suspending the display of the liquid crystal display. After that, the control circuit board 2 applies a voltage to the scanning lines 8 via the short ring power-supply line 17 for a scanning line and the nonlinear resistance element 19. Further, the control circuit board 2 applies a ground voltage to the signal lines 9 via the short ring power-supply line 18 for a signal line and the nonlinear resistance element 20. Further, a ground voltage is applied to the common electrode 13. With this, the signal lines 9 and the common electrode 13 have substantially the same potential, and the electric charge retained in the pixel electrode 12 is removed. Note that, the voltage to be applied to the scanning lines 8 via the short ring power-supply line 17 for a scanning line and the nonlinear resistance element 19 only needs to be a voltage to turn the scanning lines 8 into an on state, that is, a voltage to turn the TFT 11 communicating to the scanning lines 8 into an on state, and a range of approximately from 5 V to 40 V suffices, for example. Accordingly, the voltage to be applied to the scanning lines 8 via the short ring power-supply line 17 for a scanning line and the nonlinear resistance element 19 need not be the same as the voltage applied from the scanning-line driving circuit 4 to the scanning lines 8 at the time when the liquid crystal display performs display.

After that, the application of the voltage to the scanning lines 8 via the short ring power-supply line 17 for a scanning line and the nonlinear resistance element 19, the application of the ground voltage to the signal lines 9 via the short ring power-supply line 18 for a signal line and the nonlinear resistance element 20, and the application of the ground voltage to the common electrode 13 are suspended.

As a time period from the application of the voltage via the nonlinear resistance element until the suspension, a time period during which at least one line of the scanning lines 8 is in an on state or longer is necessary. For example, in a case where one thousand scanning lines 8 are provided and the display is rewritten with a period of 60 Hz, a lower limit of the time period is 16.7 microseconds, and at least 5 microseconds or longer are necessary. An upper limit for the time period is not provided in particular. However, it is not preferable to take excessive time for the suspension of the display of the liquid crystal display, and hence approximately several seconds suffice at the longest.

Figure 2:
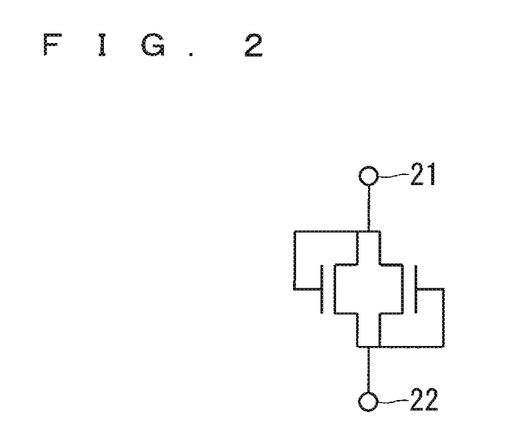
FIG. 2 is a view for illustrating an equivalent circuit of nonlinear resistance elements according to the first preferred embodiment of the present invention.

The nonlinear resistance elements 19 and 20 may be bidirectional diodes formed in the same manufacturing process as the TFT 11 provided in the pixel 16. FIG. 2 is a view for illustrating an equivalent circuit of the nonlinear resistance elements 19 and 20 being bidirectional diodes. As illustrated in FIG. 2, the bidirectional diode is formed by connecting a forward diode and a reverse diode in parallel. That is, the nonlinear resistance elements 19 and 20 are each formed of a plurality of TFTs. In the bidirectional diode, a current does not flow when a voltage between terminals 21 and 22 is small, but a current flows when the voltage between the terminals 21 and 22 is large, and hence the bidirectional diode is operated so that difference of the voltage between the terminals 21 and 22 always approaches to zero. Accordingly, as described above, when a voltage is applied to the scanning lines 8 via the short ring power-supply line 17 for a scanning line and the nonlinear resistance element 19 after suspending the application of the voltage from the scanning-line driving circuit 4 to the scanning lines 8, the scanning lines 8 can be turned into an on state. After that, when the application of the voltage to the scanning lines 8 via the short ring power-supply line 17 for a scanning line and the nonlinear resistance element 19, the application of the ground voltage to the signal lines 9 via the short ring power-supply line 18 for a signal line and the nonlinear resistance element 20, and the application of the ground voltage to the common electrode 13 are suspended, a current flows from the scanning lines 8 via the nonlinear resistance element 19, thereby being capable of reducing the voltage of the scanning lines 8.

In this manner, the nonlinear resistance elements 19 and 20 and the TFT 11 of the pixel 16 can be formed in the same manufacturing process, and hence the above-mentioned function can be obtained at a low cost. Note that, in the example of FIG. 2, the nonlinear resistance elements 19 and 20 are each formed of two TFTs. However, the nonlinear resistance elements 19 and 20 are not limited thereto, and may be formed of more TFTs. Arranging TFTs in series raises resistance and arranging TFTs in parallel lowers resistance, and hence it is possible to adjust resistance values of the nonlinear resistance elements 19 and 20. Further, the short ring line can also be formed in the same manufacturing process as the TFT 11, thus attaining effects of preventing destruction of elements due to static electricity that may be generated during the manufacturing process.

In a case where the scanning-line driving circuit 4 is an IC attached to the TFT substrate 1 from the outside, that is, in a case where the scanning-line driving circuit 4 is provided separately from the TFT substrate 1, it is possible to apply the scanning-line driving circuit 4 that lacks the function of simultaneously turning all of the scanning lines 8 into an on state. Accordingly, the number of functions of the scanning-line driving circuit 4 can be reduced, and hence it is possible to apply the low-cost scanning-line driving circuit 4.

Further, in a case where the scanning-line driving circuit 4 is formed in the same manufacturing process as the TFT 11 of the pixel 16, that is, in a case where the scanning-line driving circuit 4 is provided on the TFT substrate 1, the scanning-line driving circuit 4 only needs to have a function of turning the scanning lines 8 sequentially into an on state, and hence it is possible to form the scanning-line driving circuit 4 with simple configuration.

Next, description is given to a method of applying a ground voltage to the signal lines 9 at the time of suspending the display of the liquid crystal display.

When the display of the liquid crystal display is suspended, the control circuit board 2 suspends the operation of the signal-line driving circuit 5 to suspend the application of the voltage from the signal-line driving circuit 5 to the signal lines 9. After that, the control circuit board 2 may apply a ground voltage to the short ring power-supply line 18 for a signal line.

In a case where the signal-line driving circuit 5 is an IC attached to the TFT substrate 1 from the outside, that is, in a case where the signal-line driving circuit 5 is provided separately from the TFT substrate 1, similarly to the scanning-line driving circuit 4, it is possible to apply the low-cost signal-line driving circuit 5 with a small number of functions.

Further, in a case where the signal-line driving circuit 5 is formed in the same manufacturing process as the TFT 11 of the pixel 16, that is, in a case where the signal-line driving circuit 5 is provided on the TFT substrate 1, it is possible to form the signal-line driving circuit 5 with simple configuration. Note that, if the scanning-line driving circuit 4 has a function of outputting a ground voltage, such a function may be used.

Next, description is given to TFTs to be formed in the TFT substrate 1.

As described above, as the TFTs to be formed in the TFT substrate 1, the TFT 11 of the pixel 16 and the TFTs that form the nonlinear resistance elements 19 and 20 may be employed, for example. As an active layer being a channel layer of those TFTs, a material having Si as a main component thereof may be used, such as amorphous silicon (a-Si) or crystalline silicon (p-Si). Such a material has a comparatively large leakage current of the TFTs and hence image retention is less liable to be generated, but such a case is considered that a threshold voltage of the TFTs is shifted to be positive, for example. In this case, image retention is liable to be generated at the time of suspending the display of the liquid crystal display, but the generation of the image retention can be easily prevented by adopting the configuration of the liquid crystal display according to this first preferred embodiment described above.

Further, as another example, an oxide semiconductor formed of a zinc oxide (ZnO)-based material or an amorphous InGaZnO-based material that is obtained by adding gallium oxide ($Ga_2O_3$) and indium oxide ($In_2O_3$) to zinc oxide may be used for the active layer of the TFTs. The oxide semiconductor has a smaller leakage current of the TFTs than amorphous silicon and crystalline silicon and hence image retention is more liable to be generated, but the generation of the image retention can be easily prevented by adopting the configuration of the liquid crystal display according to this first preferred embodiment described above.

From the above, according to this first preferred embodiment, it is possible to prevent image retention from being generated with simple configuration at the time of suspending the display. Accordingly, the liquid crystal display having excellent display property can be obtained.

Note that, the above-mentioned description is merely an example, and a driving mode for the liquid crystals in the liquid crystal display may be any driving mode, such as a TN mode, an in-plane switching mode, and an FFS mode. Particularly, the present invention is effective in the case of such a driving mode that the resistance of the liquid crystals becomes high. The liquid crystal display may be a liquid crystal display of a reflection type that does not include a backlight. A part of the functions of the control circuit board 2 may be included in the scanning-line driving circuit 4 and the signal-line driving circuit 5.

Second Preferred Embodiment

<Configuration>

Figure 3:
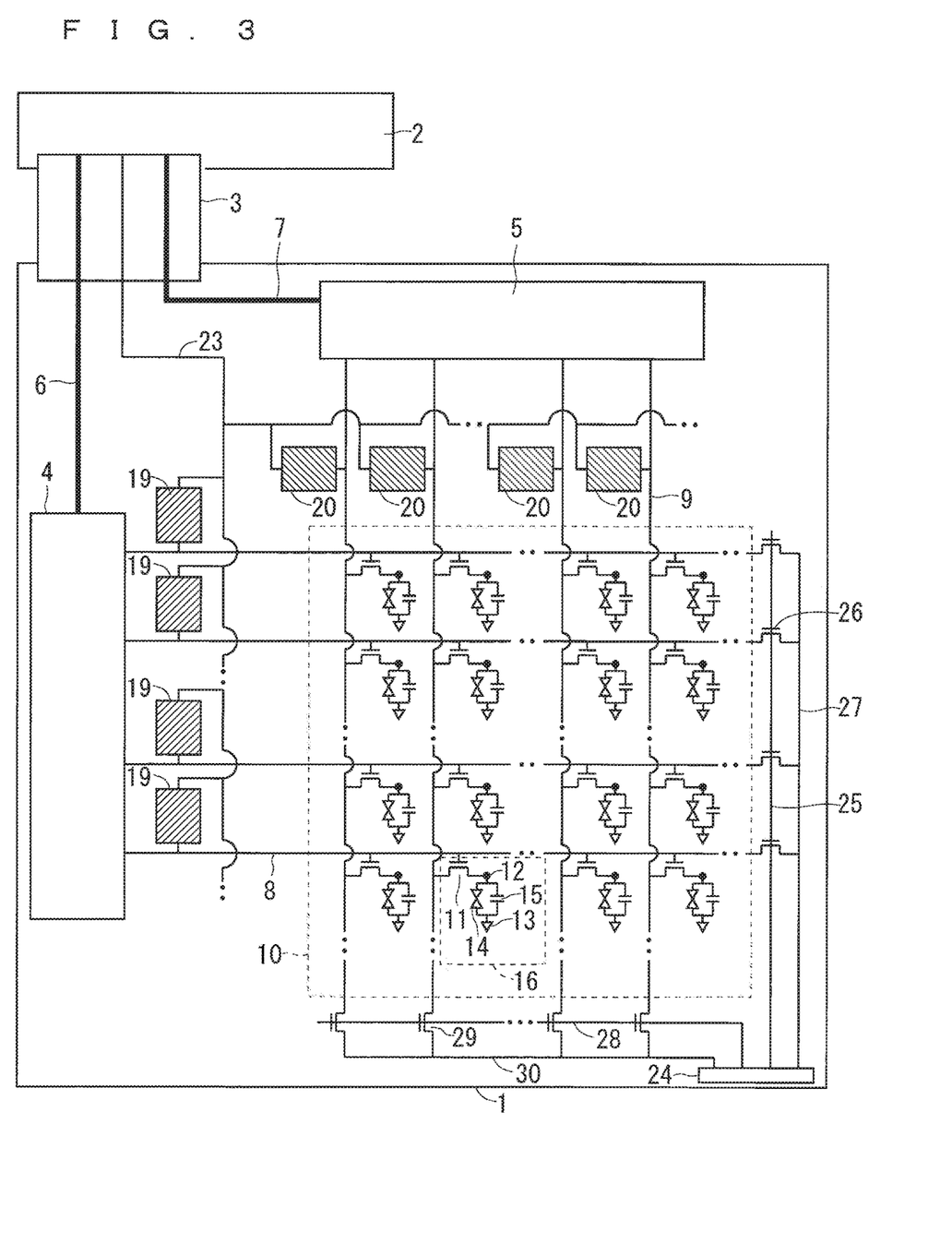
FIG. 3 is a view for illustrating an example of a configuration of the liquid crystal display according to a second preferred embodiment of the present invention.

FIG. 3 is a view for illustrating an example of a configuration of the liquid crystal display according to a second preferred embodiment of the present invention, which illustrates a circuit configuration for activating the liquid crystals 14. As illustrated in FIG. 3, the liquid crystal display according to this second preferred embodiment has a feature in including a short ring power-supply line 23, an inspection terminal 24, an inspection TFT switching line 25 on a scanning line side, an inspection TFT 26 on a scanning line side, an inspection scanning line 27, an inspection TFT switching line 28 on a signal line side, an inspection TFT 29 on a signal line side, and an inspection signal line 30. Other configurations and operations are similar to those of the first preferred embodiment, and hence detailed description thereof is herein omitted.

The short ring power-supply line 23 being a short ring line is connected to each of the scanning lines 8 and each of the signal lines 9 through intermediation of the nonlinear resistance element. The inspection TFT 26 on a scanning line side being an inspection thin film transistor on a scanning line side is formed in each of the plurality of scanning lines. The inspection scanning line 27 is arranged so as to be connected to each of the scanning lines 8 through intermediation of the inspection TFT 26 on a scanning line side. The inspection TFT 29 on a signal line side being an inspection thin film transistor on a signal line side is formed in each of the plurality of signal lines. The inspection signal line 30 is arranged so as to be connected to each of the signal lines 9 through intermediation of the inspection TFT 29 on a signal line side.

The nonlinear resistance element 19 being the first nonlinear resistance element is formed in each of the scanning lines 8. The nonlinear resistance element 19 is connected to the scanning line 8 at one end thereof, and is connected to the short ring power-supply line 23 at another end thereof. The nonlinear resistance element 20 being the second nonlinear resistance element is formed in each of the signal lines 9. The nonlinear resistance element 20 is connected to the signal line 9 at one end thereof, and is connected to the short ring power-supply line 23 at another end thereof. Note that, the nonlinear resistance elements 19 and 20 may be omitted.

<Operation>

In the following, description is given to an operation at the time of performing a simplified inspection and an operation at the time of suspending the display of the liquid crystal display.

<Operation at the Time of Performing Simplified Inspection>

The simplified inspection inspects a state of the liquid crystal display formed of the TFT substrate 1 and a color filter substrate (not shown) in the middle of the manufacturing under a state in which the TFT substrate 1 is out of connection with all of or any of the control circuit board 2, the FPCs 3, the scanning-line driving circuit 4, and the signal-line driving circuit 5.

Specifically, a voltage is applied from the inspection terminal 24 to the inspection TFT switching line 25 on a scanning line side to turn the inspection TFT 26 on a scanning line side into an on state. Then, a voltage is applied from the inspection terminal 24 to the scanning lines 8 via the inspection scanning line 27. Further, a voltage is applied from the inspection terminal 24 to the inspection TFT switching line 28 on a signal line side to turn the inspection TFT 29 on a signal line side into an on state. Then, a voltage is applied from the inspection terminal 24 to the signal lines 9 via the inspection signal line 30. With this, whether or not the lines of the scanning lines 8 and the signal lines 9 are disconnected can be determined, for example.

Note that, in FIG. 3, illustration of wiring of the common electrode 13 is omitted. The inspection terminal 24, the inspection TFT switching line 25 on a scanning line side, the inspection TFT 26 on a scanning line side, the inspection scanning line 27, the inspection TFT switching line 28 on a signal line side, the inspection TFT 29 on a signal line side, and the inspection signal line 30 can be formed in the same manufacturing process as the TFT 11 of the pixel 16 and the like, and hence additional manufacturing processes for forming those components are not required. In FIG. 3, a configuration in which the scanning lines 8 and the signal lines 9 are collectively operated is illustrated, but a configuration in which the scanning lines 8 and the signal lines 9 are operated dividedly into a plurality of times may be employed.

<Operation at the Time of Suspending Display of Liquid Crystal Display>

In the following operation, in the configuration illustrated in FIG. 3, a premise is made on a state in which the control circuit board 2 and the inspection terminal 24 are connected to allow an arbitrary voltage to be applied from the control circuit board 2 to the inspection terminal 24.

When the display of the liquid crystal display is suspended, the control circuit board 2 suspends the operations of the scanning-line driving circuit 4 and the signal-line driving circuit 5. After that, the control circuit board 2 applies a voltage from the inspection terminal 24 to the inspection TFT switching line 25 on a scanning line side to turn the inspection TFT 26 on a scanning line side into an on state. Then, the control circuit board 2 applies a voltage from the inspection terminal 24 to the scanning lines 8 via the inspection scanning line 27, thereby turning all of the scanning lines 8 into an on state. Further, the control circuit board 2 applies a voltage from the inspection terminal 24 to the inspection TFT switching line 28 on a signal line side to turn the inspection TFT 29 on a signal line side into an on state. Then, the control circuit board 2 applies a ground voltage from the inspection terminal 24 to the signal lines 9 via the inspection signal line 30. At this time, a ground voltage is also applied to the common electrode 13. After that, all of the voltages applied via the inspection terminal 24 from the control circuit board 2 are suspended. With this, the electric charge is eliminated in the pixel electrode 12, and thus image retention can be prevented from being generated.

From the above, according to this second preferred embodiment, it is possible to prevent image retention from being generated with simple configuration at the time of suspending the display. Accordingly, the liquid crystal display having excellent display property can be obtained.

Note that, in the present invention, each of the preferred embodiments may be freely combined and each of the preferred embodiments may be modified or omitted as appropriate within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display, comprising:
   a plurality of scanning lines and a plurality of signal lines arranged in a matrix pattern on a substrate;
   a pixel being formed at a crossing portion of each of the plurality of scanning lines and each of the plurality of signal lines, and comprising a thin film transistor that is connected to each of the plurality of scanning lines and each of the plurality of signal lines;

a short ring line connected to each of the plurality of scanning lines and each of the plurality of signal lines;

inspection thin film transistors on a scanning line side that are formed respectively in the plurality of scanning lines;

an inspection scanning line arranged so as to be connected to each of the plurality of scanning lines through intermediation of each of the inspection thin film transistors on a scanning line side;

inspection thin film transistors on a signal line side that are formed respectively in the plurality of signal lines;

an inspection signal line arranged so as to be connected to each of the plurality of signal lines through intermediation of each of the inspection thin film transistors on a signal line side;

an inspection thin film transistor switching line on a scanning line side arranged so as to be connected to the inspection thin film transistors on a scanning line side; and an inspection thin film transistor switching line on a signal line side arranged so as to be connected to the inspection thin film transistors on a signal line side, wherein the inspection thin film transistor switching line on a scanning line side is configured to receive a voltage to turn on the inspection thin film transistors on a scanning line side, when the inspection thin film transistors on a scanning line side are in an on state, the inspection scanning line is configured to receive a voltage to turn on all of the scanning lines, the inspection thin film transistor switching line on a signal line side is configured to receive a voltage to turn on the inspection thin film transistors on a signal line side, and when the inspection thin film transistors on a signal line side are in an on state, the inspection signal line is configured to receive a ground voltage.

2. The liquid crystal display according to claim 1, further comprising:

a plurality of first nonlinear resistance elements formed respectively in the plurality of scanning lines, each of the plurality of first nonlinear resistance elements being connected to one of the plurality of scanning lines at one end thereof and being connected to the short ring line at another end thereof; and a plurality of second nonlinear resistance elements formed respectively in the plurality of signal lines, each of the plurality of second nonlinear resistance elements being connected to one of the plurality of signal lines at one end thereof and being connected to the short ring line at another end thereof.

3. The liquid crystal display according to claim 1, further comprising a scanning-line driving circuit for applying a voltage to each of the plurality of scanning lines, wherein the scanning-line driving circuit is provided separately from the substrate.

4. The liquid crystal display according to claim 1, further comprising a scanning-line driving circuit for applying a voltage to each of the plurality of scanning lines, wherein the scanning-line driving circuit is provided on the substrate.

5. The liquid crystal display according to claim 1, further comprising a signal-line driving circuit for applying a voltage to each of the plurality of signal lines, wherein the signal-line driving circuit is provided separately from the substrate.

6. The liquid crystal display according to claim 1, further comprising a signal-line driving circuit for applying a voltage to each of the plurality of signal lines, wherein the signal-line driving circuit is provided on the substrate.

7. The liquid crystal display according to claim 1, wherein an active layer of the thin film transistor comprises silicon as a main component thereof.

8. The liquid crystal display according to claim 1, wherein an active layer of the thin film transistor comprises an oxide semiconductor.

* * * * *